United States Patent Office 2,766,001
Patented Oct. 9, 1956

2,766,001

APPARATUS FOR WEIGHING AND CLOSING FLEXIBLE WALLED CONTAINERS

Harold V. Kindseth, Frank L. Hopkins, and Harold K. Fox, Minneapolis, Minn., assignors to Bemis Bro. Bag Company, Minneapolis, Minn., a corporation of Missouri Application October 20, 1951, Serial No. 252,372

45 Claims. (Cl. 249—59)

This invention relates to new and useful improvements in apparatus for weighing and closing flexible walled containers. It more particularly relates to new and useful improvements in scales adapted for the weighing of filled flexible walled bags and to conveyors and closing machines operable in cooperation with and response thereto, and is an improvement of the subject matter of the application of Harold V. Kindseth, Ser. No. 183,229, filed September 5, 1950.

In the weighing and closing of flexible walled containers or bags, it is highly desirable to provide an efficient apparatus which will closely and efficiently weigh the material in the bag with a minimum of time consumed per bag. It is also desirable to provide a conveyor apparatus and a closing apparatus operable in cooperation therewith and in response thereto, whereby the integration of the action of the component machines provides a highly efficient and extremely utilitarian apparatus which is operable by a single operator.

An object of this invention therefore is to provide an improved machine for packaging materials into flexible walled bags, such machine being highly practical and efficient and possessing advantages not developed heretofore in bag weighing and closing apparatus.

A further object of this invention is to provide a bag weighing and closing machine wherein the various mechanisms of the machine are so arranged that a single operator may readily manipulate the apparatus with a resultant reduction in the labor of packaging material in flexible walled bags.

A further object of this invention is to provide a semi-automatic weighing machine for flexible walled bags, having a conveyor mechanism and a bag closing mechanism operable in response thereto and in conjunction therewith.

A further object of this invention is to provide a bag transporting conveyor comprised of a plurality of belts disposed in spaced parallel relation and having means adapted in cooperation therewith for automatically lifting the bag from the surface of the belt, weighing the same and returning the bag to the surface of the belt for further travel thereon to a bag closing mechanism.

A still further object of this invention is to provide new and unique means for gripping and supporting a flexible walled bag in position upon a scale mechanism.

Still another object of this invention is to provide new and useful scale mechanisms for the weighing of bags, said scale mechanism being automatic in operation if the bag is filled to the correct weight and being operable at the option of the operator should the bag be of excess weight.

Another object of this invention is to provide a new and useful scale mechanism for weighing flexible walled bags having a minimum of inertia whereby the bag may be weighed quickly and efficiently.

Still another object of this invention is to provide a new and unique scale weighing mechanism for flexible walled bags having pneumatic means for the operation of said scale mechanism, said pneumatic means being operable in response to the operation of a photo-electric cell.

Still another object of this invention is to provide a new and unique scale mechanism for weighing flexible walled containers having electric means operable in response thereto for controlling the operation of the conveyor for conveying bags therethrough and for controlling the operation of a closing machine.

Still another object of this invention is to provide in a bag weighing and closing apparatus, a new and unique electrical circuit for controlling the operation of a conveyor and closing machine in response to the operation of said scale mechanism.

A still further object of this invention is to provide a scale mechanism for weighing flexible walled bags, said mechanism being initiated into operation by the passage of a bag thereover upon a traveling conveyor.

It is a further object of this invention to provide a bag weighing and closing mechanism having an operator selectable textile sewing machine circuit and an operator selectable paper sewing machine circuit, a scale and a conveyor operable in conjunction therewith whereby selection of the paper sewing machine circuit will initiate the movement of the conveyor and the conveyor will run continuously but is susceptible to interruption by a manually operated switch and whereby selection of the textile sewing machine circuit will initiate the operation of the conveyor and cause the conveyor to run continuously when the scale is in retracted or non-weighing position only and operation of the switch when the scale is in weighing position will only cause the conveyor to run as long as the switch is closed, said switch having a plurality of stages, only one stage of which is operable when the paper sewing machine circuit is selected and both stages of which are operable when the textile sewing machine circuit is selected whereby operation of the switch to the second stage will cause the textile sewing machine mechanism to function for the closure of textile bags.

It is a further object of this invention to provide an improved apparatus for weighing and closing bags which will perform a sequence of operations to weigh and close a flexible walled bag with little help from the operator thereof, yet one in which the sequence of operations may be interrupted by the operator.

Other objects of this invention reside in the provision of a machine of the class described comprising a conveyor having a belt surface, a vertically movable bag supporting cradle or member normally positioned beneath the surface of said conveyor and having means for automatically moving it into position to engage and to support the bottom of each bag being weighed and in the provision of means for introducing additional material into each underweight bag to bring it up to full weight before the bag is passed to the bag top closing station, in the arrangement of the bag top closing means which comprises of two independent sewing units, operable in response to the operation of the conveyor and having a single foot switch and a multiplicity of positions for controlling the operation of the sewing machines, either sewing machine being useable at the discretion of the operator.

Other and further objects of this invention reside in the new and unique combination of solenoid operated pneumatic cylinders and air valves, in the combination and circuit operation of mechanical and magnetic relays and in the operation of the photo-electric cell in conjunction therewith, said circuit providing both an automatic and an operator actuable means for controlling the operation of the apparatus.

Still other and further objects of this invention are those inherent and apparent in the apparatus as described, pictured and claimed.

The invention will be described with reference to the drawings in which corresponding numerals refer to corresponding parts and in which.

Figure 1:
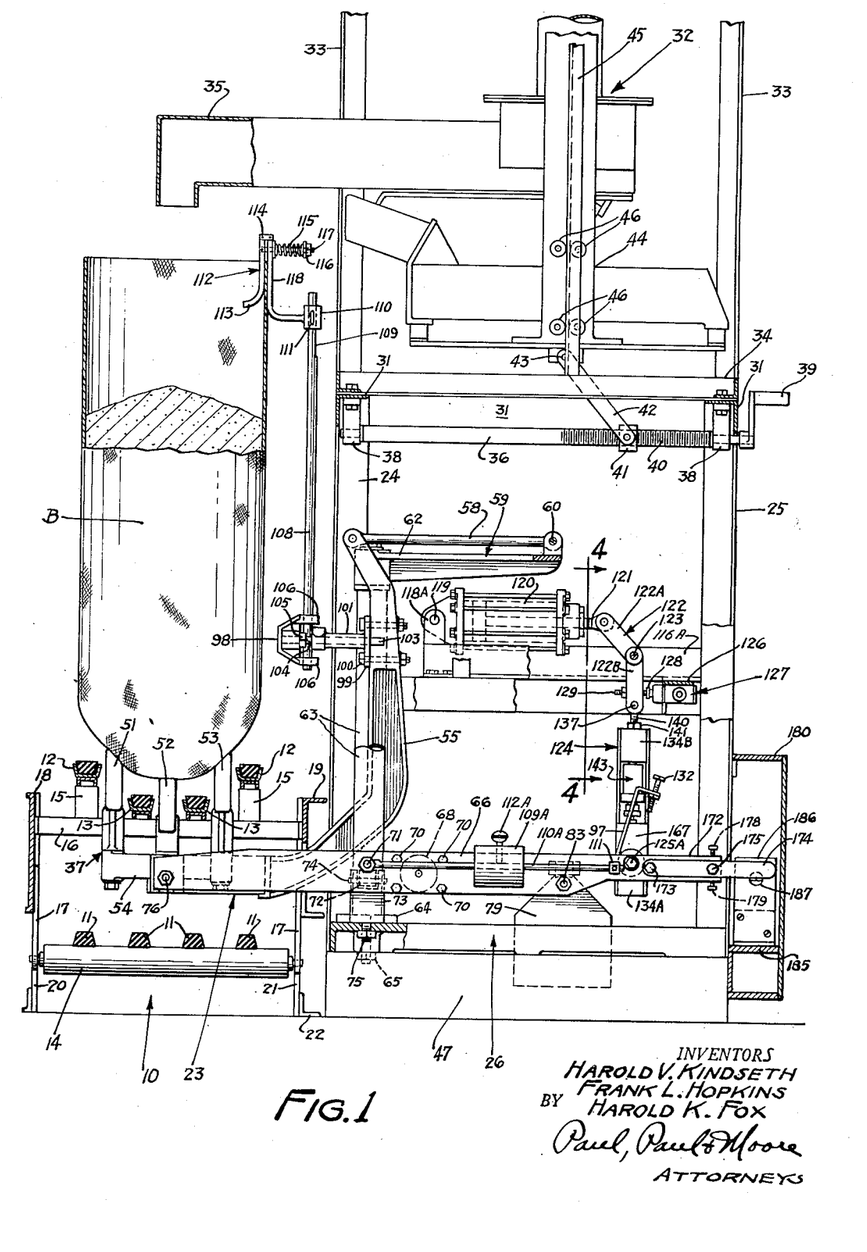
Figure 1 is a side elevational view partly broken away and partly in section, showing a bag on the scale of the instant invention and the scale in bag supporting position.

Referring now to the drawings and particularly to Figure 1, there is illustrated a conveyor generally designated 10, scale apparatus generally designated 23, and a dribbler or vibrator generally designated 32. The conveyor may be of any desired type, and per se, forms no part of this invention; hence will not be described in great detail. It may for example be of the type illustrated in the co-pending application of Harold V. Kindseth, Serial No. 183,229, filed September 5, 1950, or it may be of any other desired type but usually comprises an endless belt. It should be sufficiently long to provide travel along a station at which the bags can be filled, a station at which the bags can be weighed as illustrated in this invention and a station at which the bags can be closed. The form of conveyor 10 which is illustrated comprises a plurality of belts 11 supported upon their lower run by a plurality of supporting rollers 14, only one of which is illustrated. At the upper run the belts are supported by a plurality of belt channels 12 and 13. In the specific illustration the channels 12 are raised and supported on members 15 which are in turn supported by a cross-member 18, while the channels 13 are supported directly upon the cross-member 16. The cross-member 16, of which a plurality are used, is supported at its ends upon rails 18 and 19, the rails being supported by a plurality of uprights 20 and 21, each of the uprights being provided with a supporting floor flange 22. A plurality of depending members 17 provide support for rollers 14, the rollers 14 being journalled therein.

Figure 13:
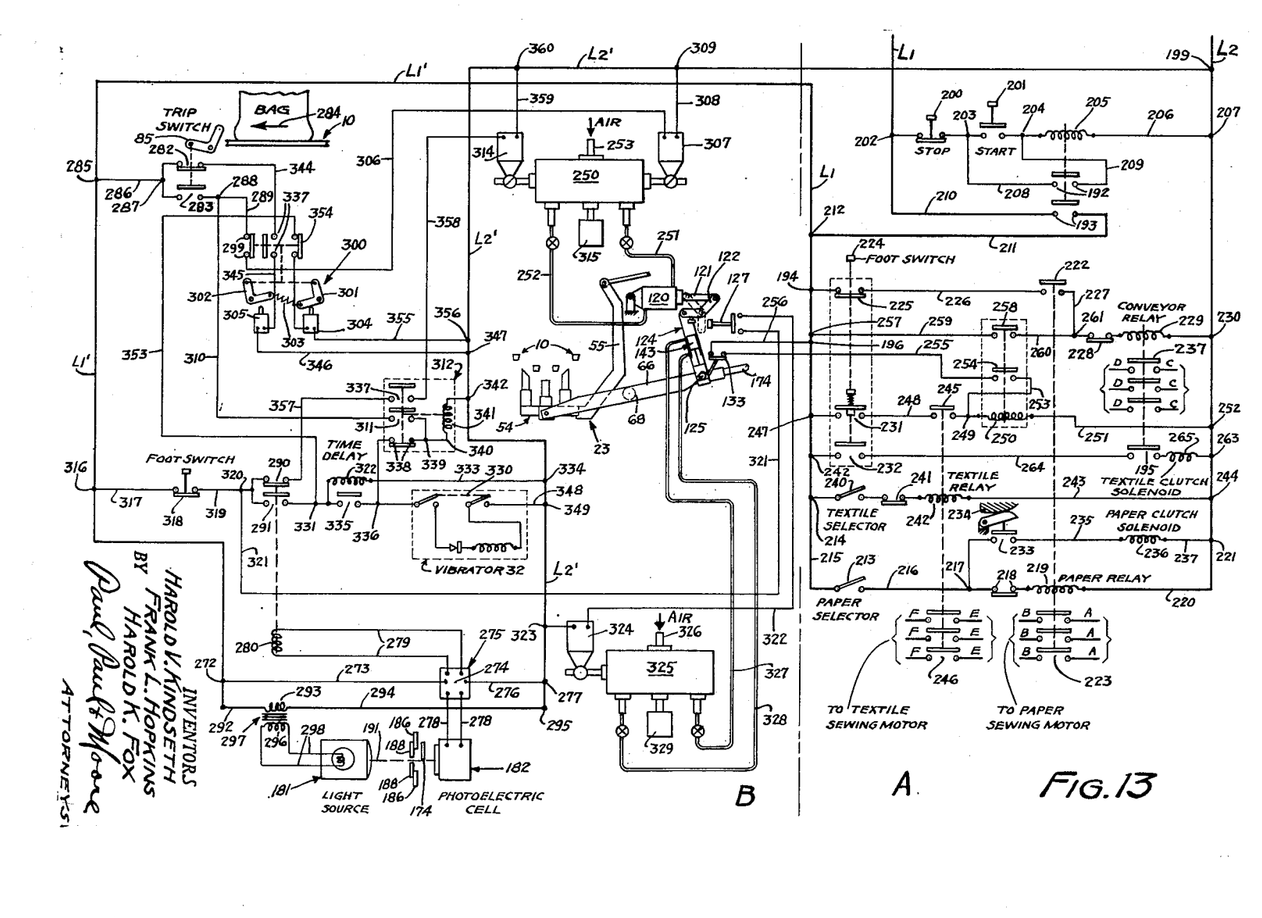
Figure 13 is a wiring diagram of the instant invention illustrating certain apparatus schematically thereon.

The conveyor drive comprises a 3-phase motor illustrated in Figure 13, having a belt drive connecting it to a clutch type pulley, for driving the V-belt run. It is to be understood that any type motor may be used and a conventional speed reducer may be provided if desired as may be some means for varying the speed of the conveyor if so desired.

Positioned directly behind the conveyor and in fixed relation thereto, whether connected integrally or only positioned in juxtaposition, is the scale apparatus generally designated 23 of the instant invention. The scale 23 is provided with a saddle 37 and it is only necessary that the saddle 37 be positioned relative to the conveyor so that the saddle may move from the retracted position of Figure 2 to the elevated position in Figure 1 and thus lift a bag from the surface of the conveyor. The scale frame comprises a pair of forward uprights 24 and a pair of rear uprights 25, the two pairs of uprights 24 and 25 forming the four corner posts of the frame. Disposed between the four uprights at the bottom thereof is a raised platform 26 having an aperture 28 at the center thereof. The platform 26 is provided with a depending lip at each edge thereof and is of rectangular shape to fit within the rectangle formed by uprights 24 and 25. The platform 26 is suitably secured to the uprights 24 and 25 in any desired manner, and rests upon four channel iron members 47 which serve to connect the bottoms of uprights 24 and 25.

Figure 3:
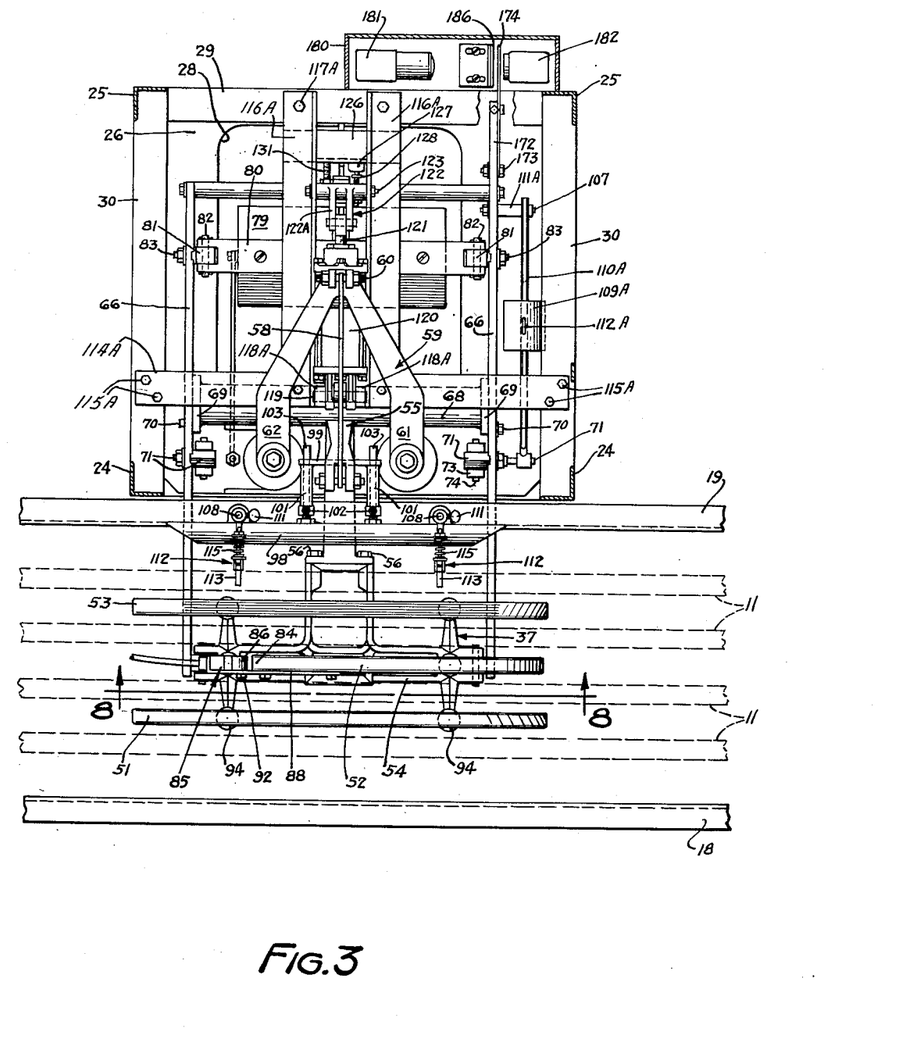
Figure 3 is a plan view of the scale of the instant invention with the bag removed therefrom.

A supporting brace 30 serves to connect each one of the upright members 24 with an upright member 25 as may be seen best with reference to Figure 3. A supporting brace 29 disposed in the same plane serves to connect the pair of upright members 25. As may be seen best with reference to Figure 1 the upper terminal ends of the pair of uprights 24 and 25 are connected by four angle iron braces 31, only two of which are shown in section in Figure 1. Thus, the four angle iron braces 31 serve to provide a rectangular bracing for the tops of uprights 24 and 25.

The vibrator generally designated 32, has a frame of box-like configuration, having four uprights 33 and four angle iron members 34 serving to connect the bottom of the uprights 33. It is of such size and configuration as to rest securely upon the rectangular support formed by the members 31 attached to uprights 24 and 25. Additional bracing members similar to members 34 may be provided for frame 32 as desired but since they alone form no part of this invention, are not illustrated.

The vibrator or dribbler 32 carried by the vibrator frame 33—34 comprises a delivery tube 35 which is provided with means whereby it may be vertically adjusted to adapt it to the height of the bags being filled. Such adjusting means is shown comprising a horizontal shaft 36 mounted in bearings 38 which are in turn attached to the underside of angle iron members 31, and having a crank 39 at one end for rotating the shaft 36. One end of the shaft 36 is threaded as indicated at 40 and a nut 41 is mounted on said threaded portion 40 and has one end of a link 42 pivoted thereto. The opposite end of the link 42 is pivoted at 43 to the vibrator or dribbler body 44 which, as will be understood with reference to Figure 1, is vertically adjustable on fixed guides 45 provided in the frame 33—34 of the dribbler or vibrator 32. Anti-friction rollers 46 may be provided on the dribbler body 44 as shown to minimize friction between the dribbler body and guides 45. The dribbler or vibrator is of a conventional type and any kind in industry use, such as the "Syntron" brand may be used. It serves upon actuation of a switch to dribble material into an underfilled bag to bring the bag up to the desired weight. During the operation of weighing and packaging the bags, the spout 35 is adjusted by means of crank 39 to the height of the particular run of bags being filled.

The scale herein disclosed generally designated 23 comprises a saddle 37 composed of a plurality of spaced parallel bars 51, 52 and 53, having depending leading ends 50, secured to a scale platform or supporting frame 54. An L-shaped arm 55 has the forward end of its lower horizontal portion fixedly secured to the frame 54 by bolts 56. The upper end of said arm 55 is pivotally connected to one end of an auxiliary scale beam 58 having its opposite end pivoted to a fixed U-support 59 by a pin 60. U-support 59 has its open end members 61 and 62 supported by a pair of cylindrical standards 63 which are in turn provided with a flange 64, standing upon platform 26 and are secured thereto by a nut 65.

The U-shape or converging inclination of the support 59 as best shown in Figure 3 aids in reducing vibration and in providing the necessary rigidity and ruggedness of said support.

Figures 2, 5, 7:
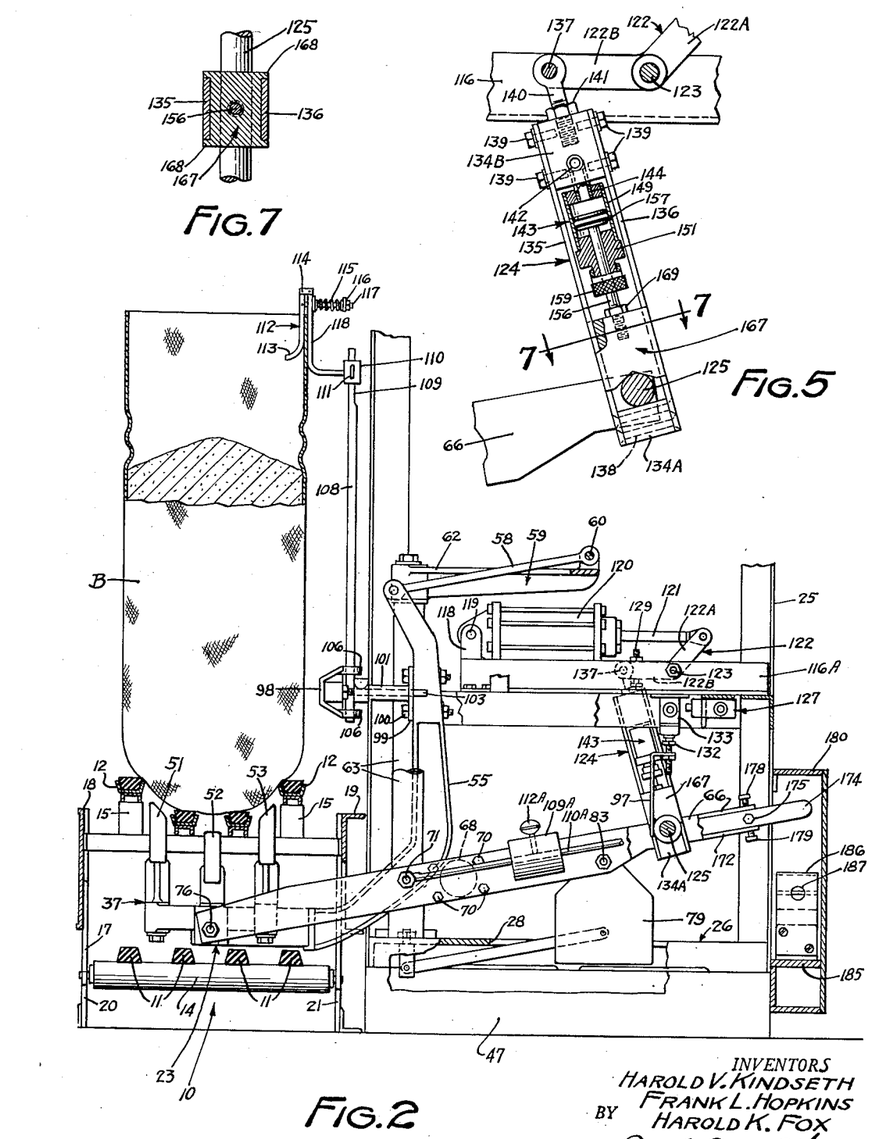
Figure 2 is a fragmentary side elevational view, similar to Figure 1, but showing the scale in the retracted position.
Figure 5 is an enlarged fragmentary and vertical sectional view showing the beam clamping pneumatic cylinder in beam clamping position.
Figure 7 is a fragmentary horizontal sectional view taken along the line 7—7 of Figure 5.

The main supporting means for the scale platform 54 is shown comprising a pair of spaced parallel scale beams 66 secured together in fixed spaced relation by a tubular member or girt 68 provided with flanged ends 69 to which the scale beams 66 are secured by suitable means such as bolts 70, as will thus be understood by reference to Figures 1–3. To support the scale beams 66, studs 71, preferably square in cross-section, but not necessarily so, are secured to the intermediate portions of the scale beams 66, and are so disposed thereon that opposed corners of each stud are located in a plane disposed at right angles to the length dimension of the scale beams. By so arranging the rectangular studs 71, the lower corner of each stud serves as a knife edge about which the beams 66 may freely pivot. V-shaped blocks 72 are shown pivotally supported on brackets 73 by pivot pins 74, brackets 73 being in turn attached to plate 26 by bolts 75, and accordingly provide self-aligning supports for the pivot studs 71 of the scale beams 66.

Figure 8:
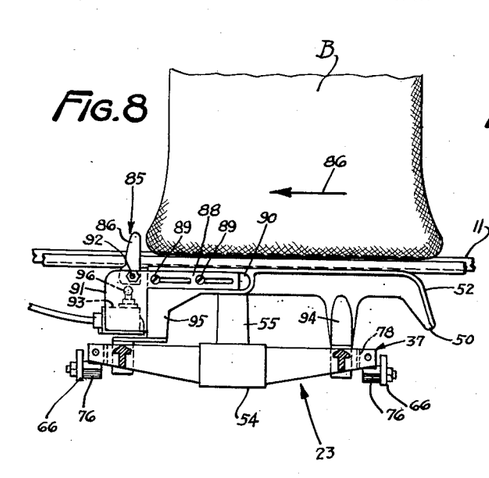
Figure 8 is a fragmentary front elevational view of the conveyor belt and scale, partially in vertical section, taken along lines 8—8 of Figure 3 and showing the bag on the conveyor about to engage the trip switch of the instant invention.
Figure 9:
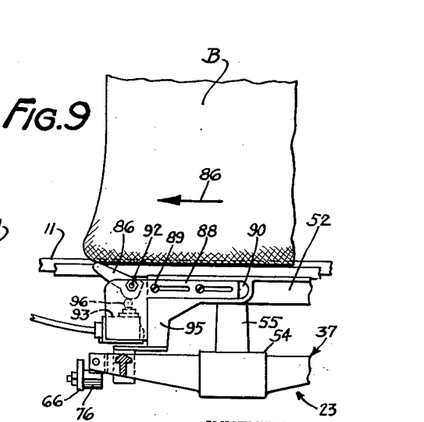
Figure 9 is a fragmentary front elevational view similar to Figure 8 but showing the bag engaging the trip switch.
Figure 10:
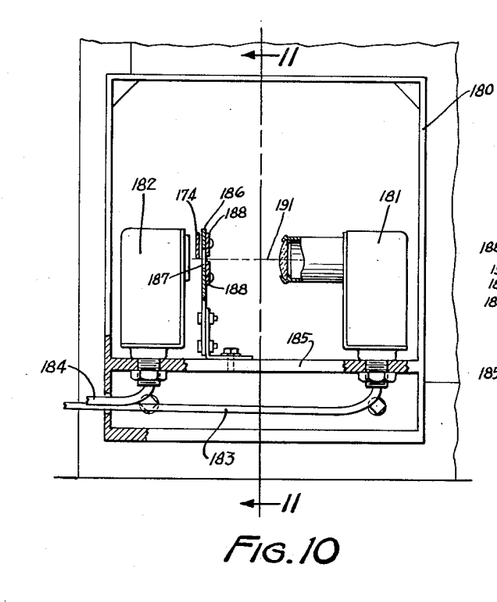
Figure 10 is a fragmentary elevation of the frame of the instant invention partially in section and showing the photo-electric cell and light source therefor.

Similar knife edged studs 76 are secured to the forward ends of the scale beams 66 for pivotally supporting the saddle 37 thereon as indicated best with reference to Figures 8 and 9. V-shaped blocks 78 similar to the blocks 72 are pivotally mounted on the scale platform 54 and cooperate with studs 76 to provide knife edge supports therefor.

To counter-balance the weight of the saddle 37 and the bag to be supported thereon, a counter-weight 79 as is shown in Figure 3 is suspended from a supporting bar 80 and extends through aperture 28, having its opposed ends forked to receive V-blocks 81 similar to blocks 72 and 78. The blocks 81 are pivotally secured at the opposite ends of the supporting bar 80 by pins 82. Knife-edged studs 83 are secured to the rear end portions of the scale beams 66 and are adapted to be engaged by the pivot blocks 81, thereby pivotally to support supporting bar 80 on the rear end portion of the scale beams 66, whereby the force of the counter-weight 79 is transmitted to the scale beams 66 and constantly tends to urge the saddle 37 upwardly to the position shown in Figure 1. The knife-edge studs 83 are similar to studs 71 and 76. The counter-weight 79 is provided with a stabilizing arm 9 journalled at one end thereto and at the other end to a depending stud 8 situated on the underside of platform 26 to prevent excessive vibration and sway of weight 79 as the scale 23 is retracted or moved to weighing position.

Referring now to Figures 1 and 2 particularly, it may be seen that the supporting bars 51, 52 and 53 of saddle 37 have cooperation configurations so as to provide the upwardly concave surface of saddle 37 for the supporting of the round bottom end of a bag thereon. Thus, with reference to Figure 1, it is noticed that bar 51 is beveled inwardly, bar 52 is flat and bar 53 is beveled inwardly and oppositely to the bevel of bar 51, thus providing a cradle support for bag B thereon. Referring now to Figure 3, it may be seen that the bars 51 and 53 are of equal length and are provided with down-turned leading edges as is bar 52 while the center supporting bar 52 has one end 84 cut off as may best be seen with reference to this figure. This is to permit placement of a trip-switch 85 which provides the means for automatically actuating the scale to elevate each bag to a position above the conveyor as each bag passes thereover whereby the bags successively come to rest beneath the vibrator spout 35 and additional material is added to the bag if the bag is underweight, as is indicated in Figure 1. To cause the scale platform to automatically elevate the bag to the position shown in Figure 1 above the conveyor, the trip switch, generally designated 85, is positioned in the path of the advancing bags as is shown best with reference to Figures 8 and 9, Figures 8 and 9 showing the scale 23 in its depressed position beneath the surface of the conveyor as the bag advances therealong in the direction of the arrow 86, it will effect the automatic action described hereinafter whereupon the bag will be moved out of contact with the conveyor and temporarily supported directly upon the scale platform 54 beneath the vibrator discharge spout 35 as is shown best in Figure 1.

The trip switch 85 is carried by an adjustable bracket 88 affixed to member 52 by screws or bolts 89. Bracket 88 is adapted to slide in way 90 of bar member 52. Bracket 88 has a depending portion 91 to which blade member 86 is pivoted by bolt 92 and to which is attached the electrical contact switch 93 by a suitable means. It may be noted at this time that while each of the bars 51 and 53 is provided with two depending supports 94, the support bar 52 is provided with one depending support 94 and with an off-set portion 95 to permit the positioning of the depending member 91 and electrical contact switch 93. The provision of the off-set portion 95 provides a surface against which the depending member 91 and switch 93 may seat for supporting engagement. The trip switch 85 is normally in the position shown in Figure 8 but when the leading lower edge of the bag B strikes the switch it pushes into the position shown in Figure 9, thus forcing the contact member 96 of the electrical switch 93 into energized position as will be more fully explained hereinafter.

Referring now to Figures 1 and 3, there is shown a fender 98 which is secured to a cross-piece 99 securely affixed to the L-member 55. The cross-piece 99 is securely affixed thereto by bolts 100 and projects on either side thereon as may be seen best with reference to Figure 3. It is provided with a pair of forwardly extending integral sleeves 101 each provided with a set screw 102 at the exterior end thereof. The sleeves 101 are adapted to receive the supporting rods 103 of fender 98, which, as seen in Figure 1, are studs having a threaded portion 104 which is threaded into bosses in the fender. Each threaded portion 104 is maintained in position on the fender 98 by a nut 105. Thus, it may be seen that the studs 103 are free to slide forwardly or rearwardly in projecting sleeves 101 are are positioned therein by the action of the set screws 102, to position the fender 98 in a forward or rearward position where it is held by set screws 102.

The fender 98 is provided with two pairs of rearwardly projecting ears 106 one adjacent each end thereof. A spindle rod 108 is provided securely affixed to each one of said pairs of ears 106. The spindle rod 108 is provided with a reduced portion 109 upon which slides a collar 110. Collar 110 is provided with a set screw 111 to adjustably position the same on the reduced portion 109. Collar 110 carries a gripper 112 which has a finger 113 curved at the bottom edge thereof and pivoted at 114 to L-member 118 which is supported by collar 110. A spring 115 positioned between the underside of nut 116 positioned on the threaded end of stud 117 which is pinned to finger 113 adjacent pivot 114 provides a resilient means for constantly urging the finger 113 in contact with the L-member 118 of the gripper 112.

The grippers 112 are used, as shown best in Figure 1, to retain the upper open mouth of a bag wall therebetween for positioning the bag with reference to the spout 35 in maintaining the mouth open while the bag is being filled.

Positioned upon one of the scale beams 66, in this instance the right scale beam with reference to Figure 3, is vernier weight 109A for use with counter-weight 79. Weight 109A is slidably positioned upon rod 110A which has one end pivoted to one of the knife edge studs 71 of the scale beam. This stud, it will be noticed by reference to Figure 3, is extended outwardly beyond scale beam 66 to provide a pivotal support for one end of the rod 110A. A keeper 111A is secured to the outer end of the same scale beam 66 for supporting the opposite end of rod 110A on the scale beam, the keeper being grooved downwardly from the top thereof and provided with a set screw 107 for maintaining the end of rod 110A therein.

The weight 109A is slidably supported on the rod 110A and has a lock screw 112A for securing it in any adjusted position on the rod 110A, and thus serves as a vernier to counter-weight 79.

Figures 4, 6:
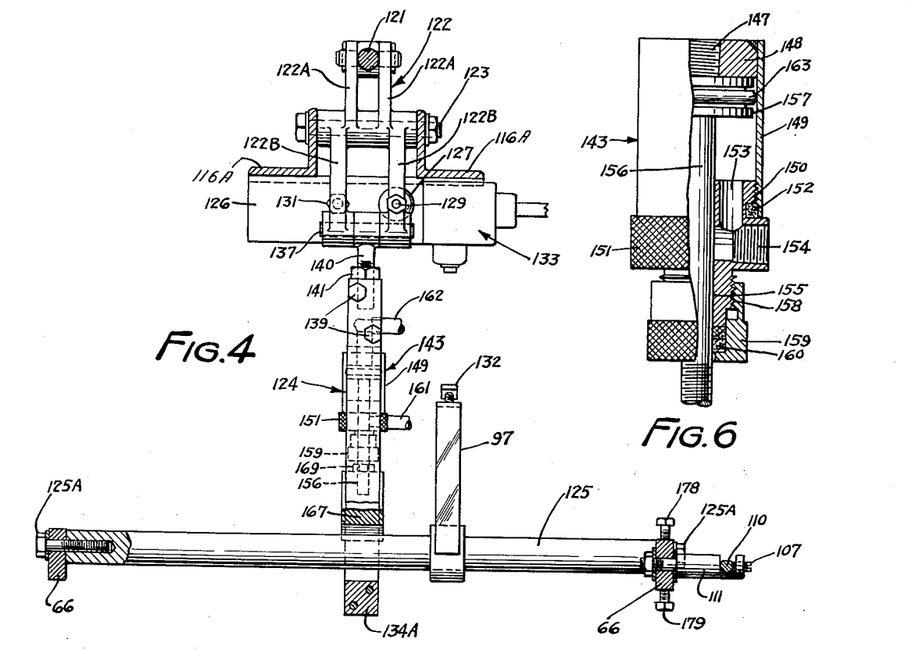
Figure 4 is an enlarged fragmentary view partially in vertical section taken along the lines 4—4 of Figure 1 showing the scale beam clamping mechanism of the instant invention in unclamped position.
Figure 6 is an enlarged view of the pneumatic cylinder shown in Figure 5, partially in vertical section, but showing the cylinder in released position.

As is best shown in Figure 3, a cross-bar 114A has its ends anchored to frame members 30 by bolts 115A. Cross member 114A is positioned substantially near the forward edges (or bottom with reference to Figure 3) of members 30. Spaced equidistant from the transverse center of cross bar 114A and extending between bar 114 and frame member 29 are a pair of angle members 116A which are secured to frame member 29 and cross bar 114A by bolts 117A. Each of the angle members 116A is provided at the forward end (or bottom end with respect to Figure 3) with an upending lug 118A through which a pin 119 is inserted for the positioning of pneumatic cylinder 120 thereon. Cylinder 120 is provided with a reciprocatable piston and a rod 121 which is pivotally connected to one end of crank 122. Crank 122 is pivoted to angle members 116 by pivot bolt 123 and has the other end connected to one end of the beam clamp generally designated 124 by a pin 137. The opposite end of the beam clamp serves to clamp beam girt 125 as will be more fully explained hereinafter. As is shown in Figure 4, the crank 122 comprises a pair of spaced arms 122A and a pair of spaced arms 122B. Girt 125 comprises a solid rod connecting the rear ends of beams 66, and being secured thereto by cap screws 125A.

Positioned beneath angle iron members 116A and extending therebetween at a point substantially adjacent the rear thereof is a switch support 126 which is comprised of a short length of an angle iron suitably connected to members 116A. It serves to support beam clamp switch 127 which is a push type contact switch and which is adapted to be engaged by the head 128 of bolt 129 which is positioned on one of the crank arms 122B when the crank 122 is in the position shown in Figure 1. The downwardly depending flange 130 of switch support 126 is provided with an adjustable bolt 131 which may be adjusted and serves as a limit stop for the operation of crank 122 engaging the other of the pair of crank arms 122A as will best be understood with reference to Figure 3. Disposed upon girt 125 is a beam clamp switch actuator 97 which is provided with an adjustable bolt 132, the head of which is adapted to engage switch 133 which is of the push contact type similar to switch 127 and is positioned on the underside of angle member 116 but forwardly of and at right angles to switch 127 as may be seen best with reference to Figures 2 and 4.

The beam clamping mechanism generally designated 124 is best seen with reference to Figures 4–7. It comprises a pair of solid blocks 134A and 134B joined together by spacer bars 135 and 136. Block 134A joins the spacer bars 135 and 136 at the bottom end thereof with reference to Figure 5 and is affixed securely positioned by rivets or pins 138. Block 134B is securely positioned with respect to spacer bars 135 and 136 by cap screws 139. Block 134B is also provided with a threaded aperture for the reception of the threaded portion of an eye bolt 140 which is secured firmly in position by nut 141 engaging the top surface of the block 134 as shown in Figure 5. Block 134B is also provided with a port 142 to which a suitable flexible air conductor 162 is attached as may best be seen with reference to Figures 4 and 5. Port 142 extends inwardly and downwardly and is connected to the pneumatic cylinder generally designated 143 by means of a short tubular nipple 144. The pneumatic cylinder generally designated 143 as may best be seen with reference to Figure 6 is provided with a threaded port 147 to which the short tubular nipple 144 is secured. Port 147 is centered in a plug 148 which is welded or otherwise affixed to cylinder wall 149. Cylinder wall 149 is threaded at the bottom end 150 thereof and a cap plug 151 is provided with threads for engagement therewith to securely close the bottom end of the cylinder 143. An annular gasket 152 is provided at the juncture of the plug 151 and the cylinder wall 149. Plug 151 is provided with a port 153 which is provided with a right angle threaded portion 154. It is also provided with a central aperture 155 therein through which passes the rod 156 of a piston 157. Cap plug 151 is also provided with a concentric depending reduced threaded portion 158 which is adapted to cooperate with gland 159. Gland 159 is provided with an interior recess portion in which packing 160 may be inserted and is threaded for engagement with threads 158 whereby it may be tightened to prevent the escape of air around rod 156 as is well understood in the art. A suitable flexible air connection 161 is provided for engagement with threads 154 of port 153 and a suitable flexible air connection 162 is provided for threaded engagement with port 142 whereby both ports of the pneumatic cylinder 143 may be connected to an air supply.

It may be noted at this time that piston 157 is provided with a resilient ring 163 which performs a normal piston ring function to prevent the escape of air therearound. Rod 156 is threaded at the lower end thereof to the V-block 167. V-block 167 is of the configuration shown in Figure 7 and is provided with guide flanges 168 at the corners thereof for cooperation with spacer bars 135 and 136. Rod 156 is maintained in threaded engagement with block 167 not only by the threaded end portion but also by the action of nut 169 engaging the upper surface of the V-block 167. When the piston 157 of the pneumatic cylinder 143 is moved pneumatically from the position shown in Figures 4 and 6 to the position shown in Figure 5, it serves effectively to grip the beam girt 125 securely between the V-surface of block 167 and block 134A as may be seen illustrated in Figure 5.

Figure 11:
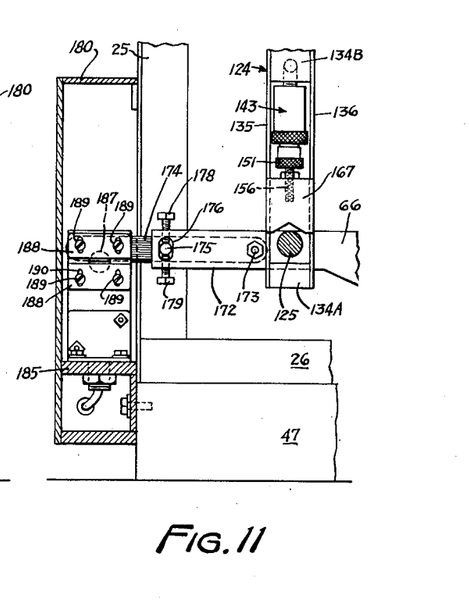
Figure 11 is a view taken along lines 11—11 of Figure 10 and showing the scale beam about to interrupt the light source from the photo-electric cell.

Referring now particularly to Figures 1–4 and 10–12, it may be seen that one of the scale beams 66, in this case the right hand one with reference to Figure 3, is provided with an integral extending portion 172 thereon. Pivoted to extension 172 by bolt 173 is a beam-interrupting lever 174. Beam lever 174 is provided with a stud 175 of the cap screw type which stud projects through an oval aperture 176 in extension 172 as shown in Figure 11. A pair of vertically and oppositely disposed cap screws 178 and 179 serve to position the lever 174 with reference to the longitudinal center plane of extension 172 as will be easily understood by reference to Figure 11.

Disposed at the rear of the scale 23 in the position best shown by reference to Figure 3 is a housing 180 which contains a light source 181 and a photoelectric cell 182. The light source is connected by a suitable connector 183 to power supply lines and the photoelectric cell is also connected by a suitable connector 184 to an amplifier and a relay as will be also explained hereinafter. The photoelectric cell 182 and the light source 181 are supported in any conventional manner, in this case being situated on a supporting web 185. Disposed between the light source 181 and the photoelectric cell 182 is a rectangular vertical beam guide or screen 186 having a circular aperture 187 therein. Disposed on the front of the beam guide are a pair of rectangular plates 188 secured thereto by screws 189 which are provided with oblong slots 190 as may be seen best with reference to Figure 11. The plates 188 thus define a slit across the surface of the circular aperture 187 the height dimension which may be adjusted by varying the position of plates 188 upon the beam guide 186. Thus, with reference to Figures 10–12 it may be seen that the light source 181 casts a beam of light designated by the line 191 through the circular aperture and to the photoelectric cell 182. The guide 186 serves to provide a control path for the beam 191 which is further controlled to a slit by the positioning of the plates 188. The light beam 191 will be cut by action of the lever 174 as it is carried by the beams 66 in pivoting about pivot point 71—72, as will be subsequently explained.

Referring now to the wiring diagram (Figure 13) and particularly to the section to the right of the dividing line and labelled A for convenience in explanation, it will be seen that L1 and L2 are the power lines connected to any suitable source of electricity. A normally closed stop switch 200 and a normally open start switch 201 are shown. When the start switch 201 is pressed to close its contacts, it will cause a circuit to extend from junction 202 on line L1 through the normally closed contacts of the stop switch 200 to junction 203 and from thence through the now closed contacts of start switch 201 to junction 204 and thence through relay 205 via line 206 to junction 207 on line L2. The start switch 201 is now released opening its contacts and resumes the position shown in Figure 13. The closure of contacts 201, actuates the relay 205 to close its two sets of contacts 192 and 193. Closure of contacts 192 establishes a circuit from junction 203 via line 208 through contacts 192 of relay 205 via line 209 to junction 204 and thus establishes a holding circuit for relay 205 and relay 205 will now remain energized even though switch 201 has resumed the position shown in Figure 13. Closure of contacts 193 by action of relay 205 also establishes a circuit from junction 202 on line L1 via section 210 of line L1 through contacts 193 via section 211 of line L1 to junction 212 of line L1, delivering power to the bag weighing circuit shown in section B of Figure 13 as well as to the conveyor and sewing machine circuit shown in section B.

When it is desired to interrupt the aforementioned circuits the switch 200 is momentarily pushed and thus interrupts the circuit to relay 205 which will drop out to the position shown in Figure 13, and accordingly opens contacts 192 and 193.

Only the circuits to the conveyor and the sewing machines will be discussed with reference to section A of Figure 13 and the circuit to the scale mechanism will be discussed with reference to section B of Figure 13. It may be noted at this point that the invention will be discussed with reference to sewing machines, but it is to be understood that other types of closing machines may be used without departing from the spirit and scope thereof and that the sewing machines are merely illustrative of one form of the invention.

Establishment of the circuit by the closure of contacts 193 from junction 202 to junction 212 does not complete any circuit to any of the conveyor or sewing mechanisms since they are in a normally inoperative state. If, for example, it is desired to sew paper bags, the normally open paper sewing machine selector switch 213 must be closed. The normally open textile sewing machine selector switch 240 is allowed to remain in its normally open position. This establishes a circuit from junction 212 of line L1 via intermediate junctions on line L1 to junction 214 of line L1, and from junction 214 via line 215 to switch 213 via line 216 to junction 217, from junction 217 to the contacts of overload relay 218 and thence through the paper sewing machine starting relay 219 and line 220 to junction 221 on line L2. The establishment of the circuit through the paper starter relay 219 closes contacts 222 and the three sets of contacts 223 for the paper sewing machine motor. Thus, the three power supply lines A are connected to the three power delivery lines B and the paper sewing machine motor begins to operate at this time. This motor now runs continuously until the circuit is broken, but sewing does not ensue until the clutch solenoid 236 is energized.

Closure of the contacts 222 establishes a circuit from junction 194 through the normally closed contacts 225 of the foot switch 224, through line 226, contacts 222 of paper relay 219 and thence through line 227 junction 261 and through the contacts of overload relay 228 and the conveyor starting relay 229 to junction 230 on line L2. The establishment of a circuit through the conveyor starting relay 229 closes the three sets of contacts 237 of the conveyor motor and thus delivers power from the power supply lines C to the power delivery lines D, thus starting the conveyor motor which now runs continuously. The establishment of a circuit to the relay 229 also causes the closure of contacts 195 which does nothing at this time since the contacts 232 of the foot switch are in the open position.

At this time a circuit also extends through junction 214 line 215 the contacts of paper switch 213 to junction 217 and thence to contacts 233 of the paper sewing machine clutch actuator switch 234 which is in the normally open position shown in Figure 13. Switch 234 is diagrammatically illustrated and may be of any conventional type as is well known in the art whereupon the insertion of a bag in the paper sewing machine head will cause the mechanical or electrical closure of contacts 233. Closure of contacts 233 establishes a circuit through line 235 and the solenoid 236 through line 237 to junction 221. The establishment of a circuit through solenoid 236 causes the engagement of a magnetic clutch which couples the now continuously running paper sewing machine motor to the sewing mechanism thereof and the paper sewing machine begins to sew. This magnetic clutch is of any conventional type well known in the art and since it of itself forms no part of this invention it will not be described in detail.

If it is now desired to stop the sewing action of the paper sewing machine, the bag may be removed from switch 234 whereby the contacts 233 will be opened, breaking the circuit through solenoid 236 and thus causing the disengagement of the magnetic clutch. This will leave the conveyor motor and the paper sewing machine motor still running. If it is desired to stop both the paper sewing machine motor and the conveyor motor, a momentary push upon stop switch 200 will accomplish this result. The push upon switch 200 opens its contacts which breaks the circuit through relay 205, thus opening both contacts 192 and 193 to interrupt the circuit to junction 212 of line L1 and deenergize all of the mechanisms. It it is desired merely to interrupt the action of the conveyor, pressure upon two stage foot switch 224 to the first stage will open contacts 225 and close contacts 231. Closure of contacts 231 will establish no circuit at this time since contacts 245 are normally open. The opening of contacts 225 will break the circuit from junction 194 through contacts 225 via line 226 through contacts 222, line 227 junction 261, overload relay 228 and conveyor relay 229 to junction 230 on line L2. Interruption of this circuit will cause relay 229 to drop out to the position shown in Figure 13 causing the three sets of contacts 237 of the conveyor motor to resume the position shown in Figure 13 and thus interrupt the operation of the conveyor motor. It will also cause the opening of contacts 195 which effects no action at this time since contacts 232 are in their normally open position. The opening of contacts 222 however will have no effect on the circuit to the paper sewing machine relay 219 and hence the sewing machine motor will continue to run and the sewing machine will continue to sew if the head switch 234 remains closed by a bag therein.

The foot switch 224 is a two-stage foot switch, and pressure on the foot switch to the first stage of operation will open contacts 225 and close contacts 231, with the effect stated previously. Further pressure to the second stage of the foot switch 224 will close the normally open contacts 232 which establishes a circuit from junction 262 on line L1 through contacts 232 via line 264 to contacts 195 which have been closed by the relay 229 and through the textile clutch solenoid 265 to junction 263 on line L2. This has the effect of operating the solenoid 265 to clutch the textile sewing mechanism to the textile sewing machine motor but only when the textile selector switch 240 is closed. When the paper selector switch 213 is closed and the paper sewing machine is being used, the textile sewing machine is not being used textile selector switch 240 is open and hence the textile sewing machine motor will not be running and the operation of the solenoid 265 to engage the paper sewing machine clutch will have no operative effect. Normally, in the operation of this invention, when the paper sewing machine is being used and the paper selector switch 213 is closed, there would be no necessity for pushing the foot switch 224 to the second stage or position and any inadvertent pressure thereon would only have the foregoing results which are of no consequence. Consequently, when the paper selector switch 213 is closed the conveyor runs continuously and the foot switch 224 is operated to interrupt the running of the conveyor, the paper motor 223 runs continuously and the paper head switch operates to intermittently engage the sewing mechanism by the operation of the paper clutch solenoid 236 causing the engagement of the magnetic clutch.

When it is desired to operate the textile sewing machine, the paper sewing machine selector switch 213 is allowed to remain in its normally open position and the textile sewing machine selector switch 240 is closed, thus establishing a circuit from junction 214 on line L1 through the textile selector switch 240, overload relay 241 and the textile relay 242, via line 243 to junction 244 on line L2. Energization of the textile relay 242 closes contacts 245 and the three sets of contacts 246 of the textile sewing machine motor. Closure of the three sets of contacts 246 connects the power supply lines E to the power delivery lines F and thus the textile motor now runs continuously. Closure of the textile starter contacts 245 conditions for establishment of a circuit between junction 247, contacts 231 via line 248 through contacts 245, to junction 249, and thence through relay 250 and via line 251 to junction 252 on line L2. It also conditions for establishment a circuit from junction 249, via line 253, contacts 254 of the relay 250 through line 255 to the contacts of beam switch 133 and then via line 256 to junction 196 on line L1.

Thus, when the beam switch 133 is in the closed position shown in Figure 13 (when the scale 23 is in retracted or in inoperative position), pressure on the foot switch 224 to the first stage will cause the opening of contacts 225 which has no effect since the contacts 222 are already open, since paper selector switch 213 is in its normally open position. Pressure to stage 1 will also close contacts 231 establishing a circuit from junction 247 through contacts 231 via line 248, and contacts 245 to junction 249. A circuit is established from junction 249 through relay coil 250 through line 251 to line L2. The energization of coil 250 causes the closure of contacts 254 and 258. Closure of contacts 254 establishes a holding circuit from junction 196 on line L1, line 256 through the contacts of beam switch 133 via line 255 through contacts 254 to junction 249. Thus, the foot switch may now be released and the relay 250 will remain energized. Closure of contacts 258 simultaneously establishes a circuit from junction 257 via line 259, through contacts 258 via line 260 to junction 251, then via overload relay 228 through conveyor relay 229 to line L2. The energization of relay 229 closes the three sets of contacts 237 to the conveyor motor. Consequently, the conveyor is now running and will continue to run when the foot switch is released by virtue of the holding circuit previously described. The energization of the coil 229 causes closure of contacts 195 thus conditioning for establishment a circuit between junction 242 on line L1 and junction 263 on line L2. The conveyor is now running continuously as is the textile sewing machine motor. However, interruption of the contacts of beam switch 133 will break the holding circuit and render the conveyor motor inoperative.

Once the holding circuit from junction 249 to junction 196 is established any subsequent operation of the foot switch to the first position will have no further effect. Operation of the foot switch to the second position will cause a circuit from junction 242 of line L1 through contacts 232 via line 264, through contacts 195 and solenoid 265 to junction 263 on line L2. Energization of the solenoid 265 will cause the engagement of a conventional magnetic clutch whereby the sewing mechanism of the textile sewing head will be clutched to the continuously running motor and sewing will commence in the textile sewing head. Thus, the switch 224 must be kept to the second position in order for the textile sewing clutch to be engaged and a release of the foot switch from this position will interrupt the circuit through solenoid 265 and thus de-clutch the sewing mechanism from the continuously running motor 246. (This foregoing all is predicated on beam switch 133 being closed, when the scale is in the retracted position.)

It will be seen that even if the contacts of beam switch 133 are broken both the conveyor and the textile clutch can be operated by maintaining the foot switch in the second position. However, if the contacts of beam switch 133 are interrupted release of pressure on the foot switch 224 from the second to the first position will cause the relay 265 to drop out and de-clutch the sewing mechanism and the conveyor will continue to run. Release of pressure from the foot switch entirely will cause the conveyor to stop also as relay 229 drops out. Hence, it may be seen that when the contacts of beam switch 133 are closed the foot switch may be initially pressed to the first position and released and the conveyor will continue to run, and any subsequent pressure of the foot switch to the first position will have no effect and the textile clutch will not be engaged until pressure of the switch 224 to the second position.

Referring now to the wiring diagram shown in section B of Figure 13, pertaining to the scale mechanism, it may be seen that the power supply lines are designated L1' and L2'. L2' is directly connected to line L2 and L1' is connected to line L1 subsequent to the insertion of contacts 193 of relay 205 therein. Thus, the aforesaid initial push on the start switch 201 establishes the shunt circuit (203—208—192—204) previously described and closes contacts 193 not only to supply electricity to junction 212 for use in the circuit for the conveyor and sewing machine heads (shown in section A of Figure 13) but also via junction 212 to line L1' for use in the scale circuit (as shown in section B of Figure 13).

The energization of lines L1' and L2' establishes a circuit through a light source generally designated 181 and also through the photoelectric cell generally designated 182 whereby a beam 191 from the light source 181 falls on the photoelectric cell 182 to maintain the two sets of contacts 290 and 291 of the photoelectric cell relay 280 in the position shown in Figure 13. Thus, a circuit is established from junction 292 on L1 through the primary coil 293 of the light source transformer generally designated 297 to junction 295 on line L2. A pair of leads 298 are connected to the secondary coil 296 of the transformer 297 and are connected at the opposite ends to the light source 181. Hence, the transmission of electricity to lines L1 and L2 energizes the light source 181 and casts a beam 191 upon the photoelectric cell 182. A circuit is at the same time established from junction 272 on line L1' via line 273 through the input contacts 274 of the photoelectric cell amplifier generally designated 275, via line 276 to junction 277 on line L2'. The photoelectric cell 182 is connected with a pair of input leads 278 leading into the amplifier 275. A pair of output leads 279 leads to a photoelectric cell relay 280 which operates to open normally closed contacts 290 and close normally open contacts 291 when the photoelectric cell 181 and consequently the relay 280 are de-energized. Contacts 290 and 291 remain in the position shown in Figure 13 as long as light beam 191 is not broken and is falling on the photoelectric cell 182. The photoelectric cell 182 is of the type, which through its amplifier 275, causes the energization of relay 280 to close contacts 291 and open contacts 290 when the light beam 191 is interrupted.

After the start switch 201 is initially closed to establish the aforementioned shunt circuit for energizing both the conveyor and sewing head circuit (shown in section A of Figure 13) and the scale circuit (shown at section B of Figure 13), the conveyor may be started by use of either the paper selector switch 213 or of the textile selector switch 240 and the foot control 224 (as explained hereinbefore with reference to section A of Figure 13), depending upon whether paper or textile bags are to be used in the particular run of bags. Energization of the lines L1' and L2' provides the circuit to the light source 181 and the photoelectric cell 182 as aforesaid. Bags are delivered to the conveyor 10 after being filled by any suitable filling apparatus, not shown, as for example, the apparatus illustrated in the application of Harold V. Kindseth, Serial No. 183,229, filed September 5, 1950, and filled to a standard weight which is slightly less than the weight to which the bag will finally be filled so that the bags are normally underweight when on scale 23. The bags will be brought up to weight by action of the vibrator 32 as hereinafter described.

Passage of a bag along the conveyor 10 in a direction shown by the arrow 284 in Figure 13 will cause the actuation of the mechanical trip switch 85 to open contacts 282 and close contacts 283. The opening of contacts 282 at this time has no effect since the contacts 337 of the mechanical relay generally designated 300 are normally open. The closure of contacts 283 establishes a circuit from junction 285 on line L1', via line 286 and junction 287 through contacts 283 on junction 288.

A circuit then extends from junction 288 through line 289 to the normally closed contacts 299 of the mechanical relay generally designated 300. The mechanical relay generally designated 300 comprises a pair of toggle arms 301 and 302 connected by a spring 303 whereby each one of the toggle arms 301 and 302 is pushed back and forth over center by the action of solenoids 304 and 305 as will be more completely explained hereinafter and as is well known. The circuit continues through contacts 299, via line 306 to solenoid 307 and thence via line 308 to junction 309 on line L2'.

A circuit also extends from junction 288 via line 310 to the normally open contacts 311 of the magnetic relay generally designated 312.

The establishment of a circuit between lines L1' and L2' through solenoid 307 actuates solenoid 307 to operate valve 250 to valve air from any suitable supply source, line 253 into line 251. The valve 250 is of a type well known in the industry and comprises a pair of solenoids 307 and 314 for actuating needle valves to supply air to lines 251 and 252 respectively. The valve 250 is also provided with an exhaust muffler 315. The admission of air to line 251 and consequently to cylinder 120 will cause the piston rod 121 to be retracted into the cylinder 120 by the operation of air from line 251 upon the reciprocal piston therein and thus cause the scale 23 to assume the weighing position shown in Figure 1 wherein a bag is supported thereby. The scale 23 thus picks the bag B off the conveyor 10. This occurs due to the admission of air from supply line 253 through valve 250 and via line 251 to the cylinder 120 by virtue of the circuit established through solenoid 307. The retraction of the piston rod 121 causes the toggle 122 to assume the position shown in Figure 1 (the dotted line position of Figure 13) and consequently causes the scale 23 to move from the position shown in Figure 2 to the position shown in Figure 1 and thus pick the bag B from the conveyor and support it thereon.

The upper wall of the bag is then grasped by the operator and inserted in clamps 112 (as is seen best in Figure 1) which hold it in upright position for the delivery of material from spout 35.

The movement of the scale from the position shown in Figure 2 to that shown in Figure 1 causes two things: first, as the toggle 122 assumes the dotted line position shown in Figure 13, switch 127 closes its two contacts and thereby establishes a circuit from junction 316 on line L1' via line 317, through the contacts of the normally closed foot switch 318 via line 319 to junction 320 and then via line 321 through the contacts of switch 127 via line 322 through solenoid 324 of valve 325 and then to junction 325 on line L2'.

Both the two solenoid control valve 250 and the differential valve 325 are well known in the art and since they form no part of the invention per se will not be described in great detail. Valve 325 is similar to valve 250 but is provided with a single needle valve operated by solenoid 324 to supply air to line 328. It is also provided with a suitable air supply line 326 and an exhaust muffler 329. The admission of air to line 328 and consequently to cylinder 143 will cause the piston rod 156 to move from the position shown in Figure 5 to the position shown in Figures 4 and 6 whereby the V-block 167 releases girt 125. This allows positive control of the scale 23 by the action of the toggle 122 until the scale platform reaches its uppermost position whereupon the retraction of V-block 167 from the engagement with girt 125 will free the beams 66 to seek their balance position with very little inertia time loss. De-energization of solenoid 324 will admit air to line 327 and cause the beam clamp V-block 167 once again to clamp girt 125.

Figure 12:
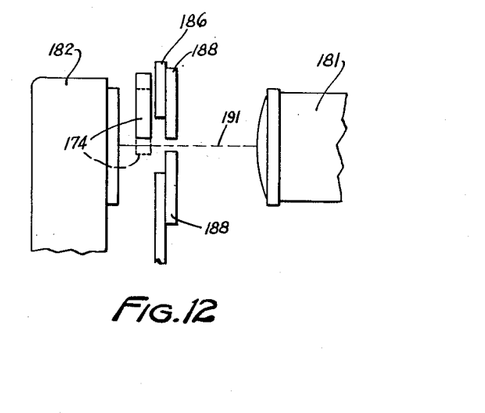
Figure 12 is an enlarged fragmentary view of Figure 10 showing the scale beam interrupting the light source to the photo-electric cell.

Second, when the scale reaches the position shown in Figure 1, the scale beam lever 174 interrupts the light beam 191 to the photoelectric cell 182 (shown in dotted lines in Figure 12). The failure of the beam 191 to reach cell 182 de-energizes the circuit to coil 280 and hence opens contacts 290 and closes contacts 291. The opening of contacts 290 has no effect at this time since contacts 337 of relay 312 are in their normally open position. The closure of contacts 291 establishes a circuit from junction 316 on line L1' via line 317 and the contacts of foot switch 318, via line 319, junction 320 and the contacts 291 to junction 331. Thence a circuit extends through the time delay relay 322 via line 333 to junction 334 on line L2'. The time delay relay has a one second delay whereupon contacts 335 are then closed and a circuit is established through contacts 335 and junction 336 to the vibrator generally designated 32 and thence via line 348 to junction 349 on line L2'. The vibrator is of a commercially obtainable type and may be of the type known as the "Syntron" brand. It is provided with a double pole switch 330 which may be opened to the position shown in Figure 13 to entirely disconnect the vibrator 32 from the circuit, but is normally closed so that a circuit extends therethrough and the closure of the time delay relay will start the vibrator vibrating to deliver material through spout 35 into bag B on the scale. The vibrator 32 then starts to feed material to the bag to bring it up to weight, or until the bag overbalances weight 79 so that beams 66 reach level position and light beam 191 once more falls on cell 182 to cut off the vibrator 32.

Closure of contacts 291 also establishes a circuit through junction 331 via line 353 to the contacts 354 of the mechanical relay generally designated 300 thence through solenoid 304 via line 355 to junction 356 on line L2'.

The circuit through solenoid 304 serves to actuate the mechanical relay 300 and to reverse the position of the toggles whereby contacts 354 and 299 will be open and contacts 337 will be closed. Closure of contacts 337 at this time has no effect since the contacts 282 are open by action of trip switch 85 being engaged by bag B, and the opening of contacts 354 serves to interrupt the circuits to solenoids 304 and 307.

A circuit also extends at this time from junction 336 through the normally closed contacts 338 of magnetic relay generally designated 312 through junction 339 via line 340 through coil 341 to junction 342 on line L2'. This causes the energization of coil 341 of relay 312 and opens contacts 338 and closes contacts 337 and 311. Contacts 311 are positioned so as to close slightly before the opening of contacts 338. Closure of contacts 311 establishes a holding circuit from junction 285 on line L1' via line 286 junction 287 contacts 283 junction 288 and line 310 to contacts 311 and from thence through junction 339 and then via line 340 through coil 341 to junction 342 on line L2. Closure of contacts 337 occasions no response at this time because the contacts 290 have been opened by the interruption of the beam 191 to photoelectric cell 271.

It may be noted at this time that weight 79 is so chosen and vernier weight 109A is so positioned that the scale will be normally balanced by an approximately standard charge underweight bag so that lever 174 will interrupt the beam 191. Should, however, a bag have gotten an excess of material therein the scale and lever 174 will still be pushed to the dotted line position of Figure 12 by action of the toggle 122 when the trip switch 85 is engaged by the bag, but because the weight of the bag will overbalance the weight of scale 23 the lever 174 will return to the full line position of Figure 12 and will not interrupt the beam 191 for the requisite one second to cause the time delay relay 325 to operate. Thus, the vibrator or dribbler will not commence action to deliver more material into the bag, and the bag will remain upon the scale without further action until the operator removes some of the excess material therefrom to bring the weight of charge down to approximately that of the standard charge underweight bag.

When the dribbler 32 has added enough additional material to bring the underweight bag to the desired weight the lever 174 will assume the position shown full lines in Figure 12 and the beam 191 will once again be uninterrupted to photoelectric cell 271. This will cause contacts 290 and 291 to assume the position shown in Figure 13. The opening of contacts 291 will thus interrupt the action of the dribbler 32 and no more material will be added to the bag. The closing of the contacts 290 will now establish a circuit from junction 320 through contacts 290 via line 357 through contacts 337 which are now closed and thence to solenoid 314 via line 358 and from solenoid 314 via line 359 to junction 360 on line L2. This causes the energization of solenoid 314, admits air to line 252 and the piston of cylinder 120 is reciprocated extending rod 121 causing the scale to assume the retracted or non-weighing position of Figures 13 and 2. This releases the bag B to conveyor 10. As the scale retracts it breaks contacts 127 thus de-energizing solenoid 324 and air is admitted from valve 325 to line 327 and the V-block 167 again clamps the girt 125 of the scale beams.

As the scale is retracted to the position shown in Figures 1 and 13 the bag is once more deposited upon the conveyor 10 and it is moved along in the direction of the arrow 294 and consequently trip switch 85 is allowed to resume the position shown in Figure 13. Trip switch thus closes contacts 282 and opens contacts 283. Closure of contacts 282 at this time establishes a circuit from junction 285 on line L1' via line 286 to junction 287, thence via contacts 282 via line 344 to contacts 337 which have been previously closed by the action of the toggle switch solenoid 304. This establishes a circuit to the solenoid 305 via line 345 and thence via line 346 to junction 347 on line L2'. This actuates solenoid 305 to reverse the toggles of the mechanical relay 300 and return them to the position shown in Figure 13. The opening of the contacts 283 by the return of trip switch 85 to the position of Figure 13 interrupts the circuit through contacts 311 and thus breaks the holding circuit of the mechanical relay 312 and returns contacts 337, 311 and 338 to the position shown in Figure 13. This de-energizes solenoid 314.

It may be seen that the apparatus has now completed one full cycle and has now been returned to its original position whereupon the engagement of the trip switch by the second bag will cause a second cyclical repetition of the foregoing events.

Thus, it may be seen that in operation the start switch 201 is initially closed to energize the conveyor and sewing head circuit shown in Section B and the scale circuit shown in Section A. If it is desired to stop either of these circuits the stop switch will be pushed and this breaks the shunt circuit from junction 203 via line 208 contacts 192 line 209 to junction 204 which maintains the flow of electricity in junction 212 and thence via lines L1 and L1' to the two circuits.

The foot switch 318 will operate when the contacts 290 and 291 are in a position shown in Figure 13 to interrupt the circuit from junction 316 on line L1' via line 317, contacts 318 line 319, junction 320 via line 321 to contacts of switch 127 and via line 322 to contacts of solenoid 324 and thence to junction 323 on line L2'. This de-energizes solenoid 324 and the de-energization of solenoid 324 as explained previously releases pressure on line 328 and admits air to line 327 to force the piston 157 to the position shown in Figures 2 and 5 and thus to cause the V-block 167 to clamp girt 125. Thus, if the scale is in the position such that beam 191 is not broken by lever 174 and the dribbler 32 is not running, the foot switch 318 may be pressed to cause the scale to be clamped firmly by the action of V-block 167 and the bag may be manipulated, inspected or additional material may be removed therefrom without vibration of the scale beams 66. If the dribbler 32 is running by virtue of the beam 191 being interrupted by lever 174 and thus contacts 291 are closed and contacts 290 open, the depression of the foot switch 318 will not only cause the clamping of the girt 125 by V-block 167 and hence the consequent steadying of the scale beams 66 but will interrupt the circuit to the dribbler and the dribbler 32 will cease running. Thus, the operator has positive control over the dribbler when it is running and also has a positive control for immobilizing the scale in the bag supporting position. The valve 250 is of the dual solenoid type for the purpose of necessitating positive solenoid action to admit air pressure to either line 251 or 252 for changing its position. Thus, the scale will remain in any position in which it is placed until a solenoid 304 or 305 and the valve 250 is actuated. On the other hand, the valve 325 is of the differential pressure type and when solenoid 324 is actuated will admit air to line 328 to unclamp girt 122 but when the solenoid 324 is de-energized it will automatically exhaust air from line 328 and admit air to line 327 constantly to clamp the girt 125 between V-block 167 and block 134A.

As many widely differing embodiments of this invention may be made without departing from the spirit and scope thereof, it is to be understood that the specific embodiments described are given by way of example only and the invention is limited only by the terms of the appended claims.

What we claim is:

1. In a bag weighing apparatus having a weighing station, and a stranded endless conveyor for delivering a bag to said station, a scale platform disposed beneath said weighing station in a normally depressed position, beam means secured to said scale platform whereby said scale platform may be pivoted from said depressed position into engagement with a bag and then to weighing position, counter-weight means secured to the opposite end of said beam means, means normally retaining the counter-weighted end of said beam means in an elevated position whereby the scale platform is disposed in said depressed position, a dribbler disposed over the scale platform at an elevation above the bag top for introducing additional material into said bag, and a trip switch positioned to be engaged by the advancing bag whereby when said bag comes to juxtaposition with said scale platform said beam means is actuated in response to said trip switch to elevate the bag into weighing position beneath said dribbler.

2. In a bag weighing apparatus having a weighing station, and a conveyor for delivering a bag to said station, a scale platform at said weighing station and normally disposed beneath the surface of said conveyor, beam means secured to said scale platform whereby said platform may be pivoted from a retracted or non-weighing position to a weighing position, a counter-weight means secured to the opposite end of said beam means, means normally retaining the counter-weighted end of said beam means in elevated position whereby the scale platform is disposed beneath the surface of the conveyor, a dribbler disposed over the scale platform at an elevation above the bag top for introducing additional material into said bag, operating means for said dribbler, and a trip switch positioned to be engaged by the advancing bag whereby when said bag comes to a position over said scale platform said means normally retaining the counter-weighted end of said beam means is actuated in response to said trip switch to automatically elevate the scale platform into engagement with the bag and to a position beneath said dribbler, and photoelectric means operated by the elevation of said scale platform for starting the dribbler thereby to deliver additional material into said bag to bring its contents up to a predetermined weight, and means for stopping said dribbler when said bag has reached said predetermined weight.

3. The apparatus of claim 2 further characterized in that said means operated by the elevation of said scale platform comprises photoelectric means, and said photoelectric means further operates when said bag is brought up to said predetermined weight to depress said scale platform to its initial position whereupon the bag is redeposited upon the conveyor.

4. The apparatus of claim 2 further characterized by a manual control for interrupting the operation of the dribbler.

5. The apparatus of claim 2 further characterized in that said scale is provided with means for interrupting the light source falling on the photoelectric cell, said means interrupting said light for initiation of the action to the dribbler as said scale is elevated with an underweight bag thereon and said means permitting the reestablishment of said light for automatic cessation of the action of the dribbler as said bag is brought up to said predetermined weight.

6. A bag weighing machine as defined in claim 2 wherein the dribbler is electrically operated and has an electric circuit connecting it to a source of current supply, a normally open switch being interposed in said circuit adapted to be closed by pivotal movement of the scale beam interrupting a light source to a photoelectric cell thereby to automatically start the dribbler each time an underweight bag is lifted off the conveyor by the scale platform and said photoelectric cell automatically opening the circuit to the dribbler to cease the action thereof when the bag has received the necessary additional material to bring the weight of its contents up to full measure and again expose the photoelectric cell to the light source.

7. In a bag weighing apparatus having a weighing station and a conveyor for delivering a bag to said station, a scale platform at said weighing station normally disposed in a retracted or non-weighing position beneath the surface of said conveyor, beam means secured to said platform whereby said platform may be pivoted from a retracted and non-weighing position to a weighing position, a counter-weight means secured to the opposite end of said beam means, means normally retaining the counter-weighted end of said beam means in elevated position whereby the scale platform is disposed beneath the surface of the conveyor, a dribbler disposed over the scale platform at an elevation above the bag top for introducing additional material into said bag, operating means for said dribbler, and switch means for actuating said means normally retaining the counter-weighted end of said beam means for automatically elevating the scale platform from a position beneath said dribbler into engagement with the bag, photoelectric means operated by the elevation of said scale platform for starting the dribbler thereby to deliver additional material into said bag to bring its contents up to the predetermined weight, and means for stopping said dribbler when said bag has reached said predetermined weight.

8. The apparatus of claim 7 further characterized in that said photoelectric means further operates when said bag is brought up to predetermined weight automatically to depress said scale platform to its initial position whereupon the bag is redeposited upon the conveyor.

9. The apparatus of claim 7 further characterized by a manual control for interrupting the operation of the dribbler.

10. The apparatus of claim 7 further characterized in that said scale is provided with means for interrupting the light source falling on the photoelectric cell, said means interrupting said light for initiation of the action to the dribbler as said scale is elevated with an underweight bag thereon, and said means permitting the reestablishment of said light for automatic cessation of the action of the dribbler as said bag is brought up to predetermined weight.

11. In a bag weighing machine having a weighing station and a conveyor for delivering an underweight bag thereto, a scale platform normally disposed beneath the surface thereof, a pivoted scale beam means having one end secured to the scale platform, a counter-weight secured to the opposite end of the scale beam, a pneumatic cylinder having a linkage connected to the counter-weighted end of said scale beam normally retaining the weighted end of the scale beam in an elevated position whereby the scale beam is disposed beneath the surface of the conveyor, a dribbler disposed over the scale platform at an elevation above the bag top, operating means for the dribbler, and a trip lever positioned to be engaged by the advancing underweight bag, whereby when the bag comes to a position over the scale platform, said trip switch is actuated to operate said pneumatic cylinder whereby said counter-weighted end of said scale beam is pivoted by said cylinder to automatically elevate said scale platform to lift the underweight bag out of engagement with the conveyor to a position beneath the dribbler, means for simultaneously starting the dribbler thereby to deliver additional material into the underweight bag to bring its contents up to full measure, and means for stopping said dribbler when said bag has reached said predetermined weight.

12. A bag weighing machine as defined in claim 11 wherein operator control means is provided for maintaining said scale in elevated position.

13. A bag weighing mechanism as defined in claim 11 wherein the dribbler is electrically operated and has an electric circuit connecting it to a source of current supply, and a normally opened switch interposed in said circuit adapted to be closed by pivotal movement of the scale beam thereby to automatically start the dribbler each time an underweight bag is lifted off the conveyor by the scale platform, and means for automatically opening the circuit to the dribbler when the bag has received the necessary material to bring the weight of its contents up to full measure.

14. The apparatus of claim 11 further characterized in that means is provided for preventing the operation of said dribbler if an overweight bag is elevated by said scale.

15. A bag weighing machine adapted for the automatic addition of material to underweight bags comprising in combination a weighing station and a conveyor for delivering bags thereto, a scale mechanism disposed at said weighing station and adapted to elevate a bag from the surface of said conveyor, a trip switch positioned at said weighing station for the automatic operation of said scale mechanism for the elevation of said bag, said scale mechanism comprising a platform and a beam means pivoted thereto, said beam means being counter-weighted at the end opposite said platform, means for normally retaining said counter-weighted end of said beam means in elevated position and said platform in depressed or non-weighing position, said means being operable upon the actuation of said trip switch for positively forcing said counter-weighted end of said beam means to a depressed position for the elevation of a bag from said conveyor by contact with said platform, said means for retaining said counter-weighted end of said scale in elevated position being adapted to allow a relatively slight pivotal movement of said counter-weighted end, normally engaged clamping means adapted for cooperation with said means for retaining said counter-weighted end in an elevated position for immobilizing said counter-weighted end, means for releasing said clamping means when said counter-weighted end is in depressed position, and means operable at the discretion of the operator for re-engaging said clamping means when said beam is in depressed position for immobilizing the same.

16. The apparatus of claim 15 further characterized in that said clamping means is automatically released upon elevation of the scale platform.

17. The apparatus of claim 16 further characterized by a switch adapted for re-engaging said clamping means at the discretion of the operator whenever said clamping means is disengaged.

18. In a bag weighing mechanism having a scale platform supported by a beam means, said beam means pivoted for movement, said platform adapted for pivotal movement from a depressed to an elevated position for the weighing of bags thereon, means for depressing the end of said beam means opposite said platform for the elevation of said platform, said means ordinarily operable for positive control of said beam means whereby the beam will be moved from an immobilized elevated position wherein the platform is in retracted position to an immobilized depressed position wherein the platform is in elevated position.

19. The apparatus of claim 18 further characterized by release means for releasing the end of said beam opposite said platform from said means for depressing for limited pivotal movement when said end opposite said platform is in said depressed position.

20. The apparatus of claim 19 further characterized in that said release means is automatically operated as said platform is moved from said depressed to said elevated position.

21. The apparatus of claim 20 further characterized in that operator actuable means is provided for re-actuation of said release means for immobilizing said opposite end of said beam when said scale platform is in elevated position.

22. In a bag weighing mechanism adapted for automatically adding material to an underweight bag placed thereon, a weighing station, a conveyor for delivering a bag thereto, a scale positioned at said weighing station, a trip switch disposed thereon, said scale comprising a platform and a beam means pivoted at one end thereto, said beam means being pivoted for the elevation of said platform, the end of said beam means opposite said scale platform being counter-weighted, means for pivoting said counter-weighted end of said beam means from an elevated position to a depressed position whereby said platform will operate to elevate a bag from said conveyor, said means being operable in response to a trip switch, said means for pivoting said counter-weighted end comprising an actuator and a linkage mechanism, said linkage mechanism serving to retain said counter-weighted end in an elevated or a depressed position, clamping means disposed in conjunction with said linkage mechanism effective to immobilize said counter-weighted beam end when said end is in elevated position and to provide a positive connection between said linkage mechanism and said beam end for the movement thereof as said counter-weighted end is moved from said elevated to said depressed position, said clamping mechanism automatically operable to release said counter-weighted end for pivotal movement when said scale platform is in elevated position, means operable at the option of an operator for re-engaging said clamping mechanism when said counter-weighted end is in depressed position, said counter-weighted end of said scale assuming a limit position when an underweight bag is placed thereon, means responsive to the depression of said counter-weighted end whereby material will automatically be added to an underweight bag, and means for terminating the addition of said material when said bag reaches full weight.

23. In a bag weighing mechanism adapted for automatically adding material to a bag containing less than a predetermined weight, a weighing station, a conveyor for delivering a bag thereto, a scale comprising a platform and supporting beam means, said scale platform normally positioned beneath said conveyor at said weighing station, said beam means pivoted at one end thereto, the end of said beam means opposite said scale platform being counter-weighted, means for normally retaining said counter-weighted end of said beam means in an elevated position whereby said scale platform will be normally positioned in said position beneath said conveyor comprising a linkage means and an actuator, said actuator being operable to pivot said counter-weighted end of said beam means from said elevated position to a depressed position whereby said scale platform will operate to elevate a bag from said conveyor, a trip switch positioned on said scale platform, said actuator being operable to pivot said counter-weighted end of said beam means in response to the engagement of said trip switch by a bag, said linkage mechanism serving to pivot said counter-weighted end from said elevated to a depressed position and adapted to allow slight pivotal movement of said counter-weighted end, clamping means disposed in conjunction with said linkage mechanism adapted to immobilize said counter-weighted beam end when said end is in elevated position and to provide a positive connection between said linkage mechanism and said beam end for the movement thereof as said counter-weighted end is moved from said elevated to said depressed position, means for automatically operating said clamping mechanism to release said counter-weighted end for said slight pivotal movement when said scale platform is in elevated position, means operable at the option of an operator for re-engaging said clamping mechanism when said counter-weighted end is in depressed position, said counter-weighted end of said scale assuming a depressed limit position when an underweight bag is placed thereon, photoelectric means responsive to said limit position of said counter-weighted end whereby material will automatically be added to a bag containing less than a predetermined weight, a time delay relay in circuit with said photoelectric means whereby said counter-weighted end must assume said limit position for a predetermined time before actuating said photoelectric relay, a dribbler positioned at an elevated position above said weighing position, said photoelectric means operable upon the energization of said time delay relay for automatically adding material to said underweight bag, means operable at discretion of said operator for re-engaging said clamping mechanism, said means also operative to interrupt the action of said dribbler, and sequence means operated by said photoelectric means as said counter-weighted end moves from said limit position to depress said scale platform for re-depositing said bag on said conveyor and to cease the operation of said dribbler and to recondition said means depressing said counter-weighted end for reactivation by subsequent energization of said trip switch.

24. In a bag weighing mechanism adapted for automatically adding material to an underweight bag placed thereon, a weighing station, a conveyor for delivering a bag thereto, a scale positioned at said weighing station, a trip switch disposed thereon, said scale comprising a platform and a beam means pivoted at one end thereto, said beam means being pivoted for the elevation of said scale platform, the end of said beam means opposite said scale platform being counter-weighted, means for pivoting said counter-weighted end of said beam means from an elevated position to a depressed position whereby said scale platform will operate to elevate a bag from said conveyor, said means being operable in response to a trip switch, said means for pivoting said counter-weighted end comprising an actuator and a linkage mechanism, said linkage mechanism serving to retain said counter-weighted end in an elevated or a depressed position, but allowing slight pivotal freedom thereof, clamping means disposed in conjunction with said linkage mechanism effective to immobilize said counter-weighted beam end when said end is in elevated position and to provide a positive connection between said linkage mechanism and said beam end for the movement thereof as said counter-weighted end is moved from said elevated to said depressed position, said clamping mechanism automatically operable to release said counter-weighted end for pivotal movement when said scale platform is in elevated position, means operable at the option of an operator for re-engaging said clamping mechanism when said counter-weighted end is in depressed position, said counter-weighted end of said scale assuming a limit position when an underweight bag is placed thereon, means responsive to the depression of said counter-weighted end whereby material will automatically be added to an underweight bag, means for terminating the addition of said material when the bag has reached full weight, and finger means carried by said scale platform adapted for gripping a section of the periphery of the upper open end of said bag for maintaining the same in an upright position beneath said dribbler.

25. The apparatus of claim 24 further characterized by sequence means operated by said photoelectric means as said counter-weighted end moves from said limit position to depress said scale platform and cease the operation of said dribbler, and said finger means adapted for automatically releasing said top of said bag as said scale platform is depressed.

26. In bag weighing machine having a weighing station and conveyor adapted to deliver a bag thereto, a scale platform disposed in a normally retracted position at said weighing station, beam means secured to said scale platform whereby said platform may be pivoted from a retracted or non-weighing position to a weighing position, counter-weight means secured to the opposite end of said beam means, means normally retaining the counter-weighted end of said beam means in an elevated position whereby said scale platform is deposited in said depressed position, said means allowing slight pivotal movement of said beam means, said beam means comprising a pair of supporting beams having a transverse member therebetween at said end opposite said scale platform, a pneumatic clamping mechanism adapted for co-operation with said means normally retaining said beam means in elevated position for clamping said transverse member to immobilize said beam means, said pneumatic clamping mechanism comprising a pair of clamping blocks one of said clamping blocks being immovable and the other of said clamping blocks being movable by said pneumatic cylinder whereby said transverse member may be engaged therebetween, and means for operating said pneumatic cylinder.

27. The apparatus of claim 26 further characterized in that said means for operating said pneumatic cylinder is normally engaged to clamp said transverse member between said blocks and adapted to release clamping engagement of said blocks when said scale platform is moved from said depressed to an elevated position.

28. In a bag weighing apparatus having a weighing station, and a stranded endless conveyor for delivering a bag to said station, a scale platform disposed beneath said weighing station in a normally depressed position, beam means secured to said scale platform at one end whereby said scale platform may be pivoted from said depressed position into engagement with a bag and then into weighing position, counter-weight means secured to the opposite end of said beam means, and means normally retaining the counter-weighted end of said beam means in fixed elevated position whereby the scale platform is disposed in said depressed position, said means being operable to force said platform into engagement with said bag and then to said elevated position.

29. In a bag weighing mechanism adapted for adding material to an underweight bag placed thereon, a weighing station, a conveyor for delivering a bag thereto, means for operating said conveyor, a scale positioned at said weighing station, said scale comprising a platform positioned in retracted position and means for moving said scale platform into engagement with a bag and for then elevating said scale platform and said bag, said means for moving said scale platform into engagement with said bag comprising a means normally retaining said scale platform in fixed retracted position and operative positively to move said scale platform into bag engaging position and then to elevated position, and means responsive to the progress of a bag along said conveyor for moving said means normally retaining said scale platform from said fixed retracted position to bag engaging position to elevated position.

30. The apparatus of claim 29 further characterized in that said means responsive to the progress of said bag comprises a trip switch positioned on said scale platform.

31. The apparatus of claim 29 further characterized by means responsive to the elevation of said scale platform for stopping the movement of said conveyor.

32. The apparatus of claim 29 further characterized by means responsive to the elevation of said scale platform for stopping the motion of said conveyor, and for starting means for adding additional material to an underweight bag.

33. In a bag weighing mechanism adapted for automatically adding material to an underweight bag placed thereon, a weighing station, a conveyor for delivering a bag thereto, a scale positioned at said weighing station, said scale comprising a platform and supporting means pivoted at one end thereto, first means movable from a first position in which said supporting means is elevated and said scale platform is depressed to a second position in which said supporting means is depressed and said scale platform is elevated, and means for moving said first means from said first to second position, second means movable from a first position for fixedly positioning said supporting means in relation to said first means to a second position wherein said supporting means is allowed limited movement with respect to said first means and means for moving said second means from said first to said second position.

34. The apparatus of claim 33 further characterized by means responsive to the progress of a bag along said conveyor for moving said first means from said first to said second position.

35. The apparatus of claim 33 further characterized by means responsive to the depression of said supporting means whereby material will be added to an underweight bag.

36. In a bag weighing mechanism adapted for automatically adding material to an underweight bag placed thereon, a weighing station, a conveyor for delivering a bag thereto, a scale positioned at said weighing station, said scale comprising a platform and a beam means pivoted at one end thereof, said beam means being pivoted for the elevation of said platform, the end of said beam means opposite said scale platform being counterweighted, means for pivoting said counterweighted end of said beam means from an elevated to a depressed position whereby said platform will operate to elevate a bag from said conveyor, said means for pivoting said counterweighted end comprising an actuator and a linkage mechanism, said linkage mechanism serving to retain said counterweighted end in an elevated or depressed position, clamping means disposed in conjunction with said linkage mechanism effective to immobilize said counterweighted beam end when said end is in elevated position and to provide a positive connection between said linkage mechanism and said beam end for the movement thereof as said counterweighted end is moved from said elevated to said depressed position, said clamping mechanism automatically operable to release said counterweighted end for pivotal movement when said scale platform is in elevated position, said counterweighted end of said scale assuming a limit position when an underweight bag is placed thereon, means responsive to the limit position of said counterweighted end whereby material will be added to an underweight bag, and means for terminating said addition of material.

37. In a weighing mechanism for the addition of material to an underweight bag having a weighing station and a conveyor for delivering bags thereto, a scale adapted to receive bags from said conveyor for weighing the same, photoelectric means adapted for operation and cooperation with said scale whereby said photoelectric means will operate when an underweight bag is placed on said scale to initiate the action of a dribbler to supply additional material thereto, a time delay relay operable in conjunction with said photoelectric means whereby said photoelectric means will not be actuated until an underweight bag has been on said scale a predetermined length of time and said photoelectric means being operable as said underweight bag is brought up to full weight to terminate the action of said dribbler.

38. In a bag weighing apparatus having a weighing station, and a conveyor for delivering a bag to said station, a scale platform disposed beneath said weighing station in a normally depressed position, means secured to said scale platform whereby said scale platform may be elevated from said depressed position into engagement with a bag and then into elevated weighing position.

39. The structure of claim 38 further characterized by means for introducing additional material into said bag, means for starting said means for introducing additional material to the bag thereby to deliver additional material into said bag to bring its contents up to predetermined weight, and means for terminating the introduction of additional material into the bag when said bag has reached predetermined weight.

40. The structure of claim 39 further characterized in that said means for starting said means for introducing additional material to said bag is responsive to the elevation of said scale and said means for pivoting said scale to said depressed position is responsive to the termination thereof.

41. In a bag weighing machine having a weighing station and a conveyor adapted to deliver a bag thereto, a scale platform disposed in a normally retracted position at said weighing station, means secured to said scale platform whereby said scale platform may be elevated from said retracted position into engagement with a bag and then into elevated position, the improvement comprising a clamping mechanism movable from a first to a second position, said clamping mechanism when in said first position immobilizing said scale platform with reference to said means secured thereto and when in said second position allowing limited movement of said scale platform with reference to said means secured thereto.

42. The structure of claim 41 further characterized by means responsive to the elevation of said scale platform for moving said clamping mechanism from said first to second position.

43. The structure of claim 41 further characterized by operator actuable means for moving said clamping mechanism from second to first position.

44. The structure of claim 41 further characterized by means responsive to the depression of said scale platform for moving said clamping means from second to first position.

45. In a bag weighing apparatus having a weighing station, a conveyor for delivering a bag to said station, a scale platform disposed beneath said weighing station in a normally depressed position, means secured to said scale platform whereby said scale platform may be elevated from said depressed position into engagement with a bag and then to elevated weighing position, photoelectric means adapted for operation in cooperation with said platform whereby said photoelectric means will operate when an underweight bag is placed on said platform to initiate the action of a dribbler to supply additional material thereto, a time delay relay operable in conjunction with said photoelectric means whereby said photoelectric means will not be actuated until an underweight bag has been on said platform a predetermined length of time, and said photoelectric means being operable as said underweight bag is brought up to full weight to terminate the action of said dribbler.

References Cited in the file of this patent

UNITED STATES PATENTS

| | | |
|---|---|---|
| 1,246,354 | Thomas | Nov. 13, 1917 |
| 1,300,274 | Jeffries | Apr. 15, 1919 |
| 1,570,300 | Case | Jan. 19, 1926 |
| 2,039,257 | Middelboe | Apr. 28, 1936 |
| 2,054,279 | Briggs | Sept. 15, 1936 |
| 2,073,432 | Von Segebaden et al. | Mar. 9, 1937 |
| 2,076,617 | Cleaves | Apr. 13, 1937 |
| 2,182,408 | Phillips et al. | Dec. 5, 1939 |
| 2,244,718 | Long | June 10, 1941 |
| 2,310,988 | Nowak | Feb. 16, 1943 |
| 2,354,087 | Raymer | July 18, 1944 |
| 2,362,462 | Belcher et al. | Nov. 14, 1944 |
| 2,376,810 | Richardson | May 22, 1945 |
| 2,385,233 | Robinson | Sept. 18, 1945 |
| 2,455,433 | Matsen et al. | Dec. 7, 1948 |
| 2,458,228 | Vredenburg | Jan. 4, 1949 |
| 2,581,695 | Olofsson | Jan. 8, 1952 |
| 2,634,082 | Knobel | Apr. 7, 1953 |
| 2,645,447 | Clark | July 14, 1953 |